(12) United States Patent
Cushing et al.

(10) Patent No.: US 9,231,901 B1
(45) Date of Patent: Jan. 5, 2016

(54) SUBSCRIBING USERS TO ENTITIES WITHIN AN ONLINE COMMUNITY AND NOTIFYING USERS OF UPCOMING MEETINGS

(71) Applicant: Google Inc., Mountain View, CA (US)

(72) Inventors: Kathryn Chapman Cushing, San Francisco, CA (US); David Scrymgeour Bennett, Snohomish, WA (US); David Cohen, Mountain View, CA (US); Zachary Yeskel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 434 days.

(21) Appl. No.: 13/722,862

(22) Filed: Dec. 20, 2012

Related U.S. Application Data

(60) Provisional application No. 61/658,867, filed on Jun. 12, 2012.

(51) Int. Cl.
*G06F 15/16* (2006.01)
*H04L 12/58* (2006.01)

(52) U.S. Cl.
CPC ..................................... *H04L 51/32* (2013.01)

(58) Field of Classification Search
USPC .......................... 709/204, 205, 206, 218, 223
See application file for complete search history.

(56) References Cited

U.S. PATENT DOCUMENTS

| | | | |
|---|---|---|---|
| 2008/0126476 A1* | 5/2008 | Nicholas et al. | 709/203 |
| 2011/0270719 A1* | 11/2011 | Hollars et al. | 705/30 |
| 2012/0004956 A1* | 1/2012 | Huston et al. | 705/14.1 |
| 2012/0059922 A1* | 3/2012 | Jason et al. | 709/223 |
| 2013/0176895 A1* | 7/2013 | McEachern et al. | 370/254 |

* cited by examiner

*Primary Examiner* — Liangche A Wang
(74) *Attorney, Agent, or Firm* — Patent Law Works LLP

(57) ABSTRACT

Systems and methods for notifying users of upcoming communication sessions in a virtual forum of an online community, for example, a video or audio forum, in which multiple users "hang out" and communicate. Users are notified of these upcoming meetings in advance, so they may participate in them, even at short notice, for example, in the event a meeting is ongoing. In some embodiments, the systems and methods permit users to subscribe to a particular entity within an online community, which may either be individuals (for example, a celebrity), company pages, groups, etc. Those who subscribe to the particular entity are immediately notified in the event a meeting relating to the entity is designated to occur or is ongoing.

17 Claims, 13 Drawing Sheets

SUBSCRIBING USERS TO ENTITIES WITHIN AN ONLINE COMMUNITY AND NOTIFYING USERS OF UPCOMING MEETINGS

CROSS REFERENCE TO RELATED APPLICATIONS

The present application claims the benefit of priority under 35 U.S.C. §119(e) of U.S. Provisional Application No. 61/658,867 entitled "Subscribing Users to Entities Within an Online Community and Notifying Users of Upcoming Meetings," filed on Jun. 12, 2012, the entire contents of which are incorporated by reference herein.

BACKGROUND

The present disclosure relates to managing communication sessions in on line communities. In particular, the present disclosure relates to managing subscriptions to communication sessions associated with a particular entity of an online community and notifying those who subscribe or other users of upcoming communication sessions associated with the particular entity.

Over the last decade, online communication has become more and more prevalent. Every day thousands if not millions of people create online discussions and plan for future online discussions. These online discussions may take place in different virtual forums, for example, a "video chat" forum, instant messaging, an "audio chat" forum, etc.

Currently, it is difficult for users to keep track of all the various online forums (for meetings) in which a user desires to attend or participate. Typically, users initiate discussions or participate in them spontaneously. Also, there is no efficient way to notify users of upcoming communication sessions among others, which may be of interest to the users.

With the ongoing trends and growth in online communication sessions and meetings, it would certainly be beneficial to find better ways to provide users and other interested entities, who participate in meetings, online discussions, or the like, with notifications of upcoming meetings in which the users may wish to participate.

SUMMARY

In some embodiments, this technology comprises systems and methods for notifying users of upcoming communication sessions in a virtual forum of an online community, for example, a video or audio forum in which multiple users "hang out" and communicate. Users are notified of these upcoming communication sessions or meetings in advance, so they may participate in them, even at short notice, for example, in the event a meeting is ongoing.

In some embodiments, the systems and methods permit users to subscribe to a particular entity within an online community, which may either be individuals (for example, a celebrity), company pages, groups, etc. Those who subscribe to the particular entity are immediately notified in the event a meeting relating to the entity is designated to occur or is ongoing. As one example, to arrange a meeting among subscribers, initiated by one particular subscriber (who in this case is the particular entity), the systems and methods first receive identification or subscription information from the particular subscriber who wishes to initiate a meeting. Subscribers to that particular entity are notified of the meeting, either before by invitation, or when the meeting is initiated or ongoing. A meeting may be initiated (e.g., by video conference, audio, chat, instant messaging, etc.), and those who are designated subscribers for that entity may join and attend the meeting (e.g., via email, chat, mobile push notification, phone call, etc.). In some embodiments, a particular user may indicate that he or she wants to participate in a particular meeting (e.g., by pressing a button or otherwise), before he or she is added to the meeting.

In some embodiments, the systems and methods 1) designate meeting information for a particular meeting (e.g., the name and time for the meeting, the date of the meeting, etc.), 2) notify users who are subscribers to participate in the meeting (whether in the future or ongoing) and add them to the meeting, 3) notify users who are subscribers of any upcoming meetings, 4) provide users schedules of any upcoming meetings, and 5) initiate meetings for particular entities by retrieving relevant information.

In yet other embodiments, the systems and methods provides displays to users who subscribe to a particular entity, lists of upcoming meetings for that particular entity. The subscribing users are permitted to view the lists and only join meetings that are of particular interest to them. The systems and methods formulate one or more lists of upcoming meetings based on various criteria, for example, all meetings of interest to subscribers to various entities, meetings for the general public (non-subscribers), meetings by invitation of a particular subscriber, etc.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Figure 1:
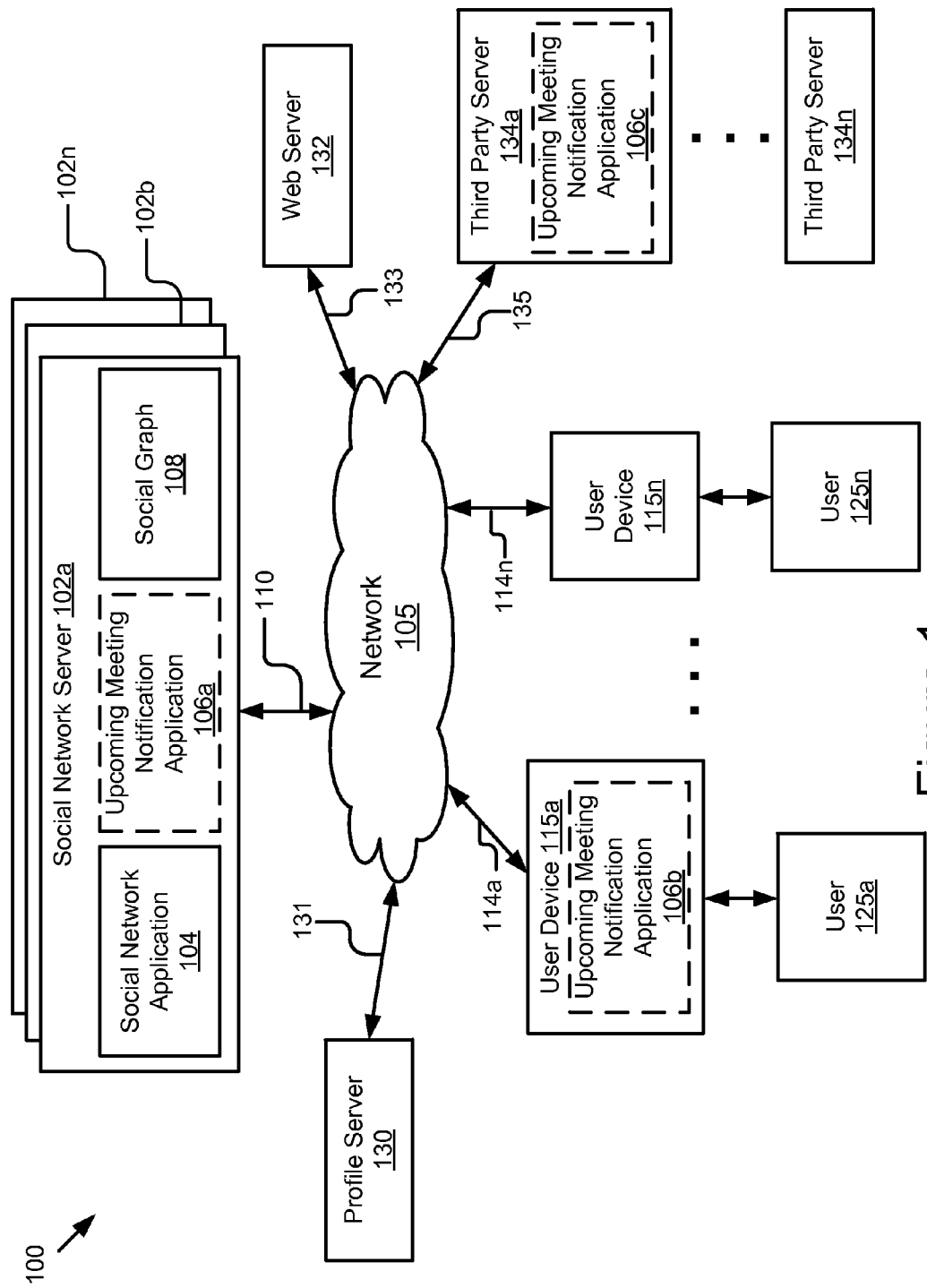
FIG. 1 is a high-level block diagram illustrating some embodiments of systems for notifying users of upcoming communication sessions or meetings, including an upcoming meeting notification application.

In some embodiments, this technology comprises systems and methods for notifying users of upcoming communication sessions, meetings or online discussions and for managing subscriptions to particular entities (a particular individual, for example, a celebrity, a group, company, or page) within an online community or service by users. The systems and methods also notify users who have subscriptions to particular entities, of upcoming communication sessions and meetings hosted by the particular entities. Reference to a "meeting" in this specification and the drawings represent any electronic communication between one or more users (e.g., video chat, instant messaging, audio chat, etc.). These meetings or visual communication may be conducted in any of a myriad of ways, for example, one-on-one via telephone, telephone conferences among several people, video conferences or visual communications within online communities, for example, social networks, or otherwise. Specifically, in some embodiments, this technology comprises systems and methods for managing user subscriptions to particular entities and notifying the users of upcoming communication sessions and meetings. It should be recognized that any data that is acquired or obtained before, during, or after meetings, is only after notifying each of the users participating in a meeting and/or obtaining their consent or permission to do so.

In some embodiments, the systems and methods may schedule a communication session or meeting for a particular entity requesting the meeting or online discussion, for example, a leader or host responsible for creating a meeting. The systems and methods receive meeting information (e.g., name, time, date, etc.) from one or more users who wish to participate in the meeting. The systems and methods then add one or more users as "participants" to the meeting. The systems and methods notify the participants of the upcoming meeting before the meetings occur, for example, at predetermined times. The systems and methods also notify the participants again once the date and time of the meeting has arrived. The subsequent notifications may be before or after the meeting has been initiated, in other words, while the meeting is ongoing.

In some embodiments, the systems and methods manage subscriptions by one or more users to one or more entities within the online community. A user may subscribe to one or more entities (e.g., individuals, company pages, groups, etc.) by indicating (e.g., by pressing a button or otherwise) that he or she would like to participate in a future meeting. This user preference is stored in a data storage associated with the systems and methods.

In some embodiments, the systems and methods send notifications to one or more participants of the one or more upcoming meetings. A "notification" may be sent by an email, a chat session, a mobile push notification, a telephone call, etc. A "notification" may include a description of the upcoming meeting, indicate a method for joining the meeting (e.g., a button), a list of participants in the meeting (with an indication of those who will participate), the date and the time of the meeting, etc. The notification may be transmitted either before or after the meeting is initiated, that is, while a meeting is ongoing.

In some embodiments, the systems and methods add users to an ongoing (i.e., already initiated) meeting. For example, users may indicate (e.g., by pressing a button in a notification) that they would like to join an upcoming or ongoing meeting. The systems and methods then add the users to the meeting (i.e., the virtual forum).

FIG. 1 is a high-level block diagram illustrating some embodiments of systems for notifying users of upcoming meetings by managing user subscriptions to particular entities. The system 100 illustrated in FIG. 1 provides system architecture for notifying users of upcoming meetings or communication sessions by determining user subscriptions to entities. The system 100 includes one or more social network servers 102a, 102b, through 102n, that may be accessed via user devices 115a through 115n, which are used by users 125a through 125n, to connect to any one of the social network servers 102a, 102b, through 102n. These entities are communicatively coupled via a network 105. Although only two user devices 115a through 115n are illustrated, persons of ordinary skill in the art should recognize that any numbers of user devices 115n may be used by any number of users 125n.

Moreover, those skilled in the art should recognize that while the present disclosure is described below primarily in the context of providing a framework for managing subscriptions to particular entities within an online community, for example, a social network, and notifying users who have subscriptions of upcoming meetings, the present disclosure may be applicable to other situations where notifying users for any purpose that is not related to meetings, is necessary or desired. For ease of understanding and brevity, the present disclosure is described in reference to notifying users of upcoming meetings by determining user subscriptions to entities or otherwise.

The user devices 115a through 115n in FIG. 1 are illustrated by way of example. Although FIG. 1 illustrates only two devices, the present disclosure applies to any system architecture having one or more user devices 115, therefore, any number of user devices 115n may be used. Furthermore, while only one network 105 is illustrated as coupled to the user devices 115a through 115n, the social network servers, 102a-102n, the profile server 130, the web server 132, and third party servers 134a through 134n, in practice, any number of networks 105 may be connected to these entities. In addition, although only two third party servers 134a through 134n are shown, the system 100 may include any number of third party servers 134n.

In some embodiments, the social network server 102a is coupled to the network 105 via a signal line 110. The social network server 102a includes a social network application 104, which comprises the software routines and instructions to operate the social network server 102a and its functions and operations. Although only one social network server 102a is described here, persons of ordinary skill in the art should recognize that multiple servers may be present, as illustrated by social network servers 102b through 102n, each with functionality similar to social network server 102a or different.

The term "social network" as used here encompasses its plain and ordinary meaning including, but not limited to, any type of social structure where the users are connected by a common feature or link. The common feature includes relationships/connections, e.g., friendship, family, work, a similar interest, etc. The common features are provided by one or more social networking systems, such as those included in the system 100, including explicitly-defined relationships and relationships implied by social connections with other online users, where the relationships form the social graph 108.

The term "social graph" as used here encompasses its plain and ordinary meaning including, but not limited to, a set of online relationships between users, such as provided by one or more social networking systems, such as the social network system 100, including explicitly-defined relationships and relationships implied by social connections with other online users, where the relationships form a social graph 108. In some examples, the social graph 108 may reflect a mapping of these users and how they are related.

It should be understood that the social network server 102a and the social network application 104 are representative of a single social network. Each of the plurality of social network servers 102a, 102b through 102n, is coupled to the network 105, each having its own server, application, and social graph. For example, a first social network hosted on a social network server 102a may be directed to business networking, a second on a social network server 102b directed to or centered on academics, a third on a social network server 102c (not shown) directed to local business, a fourth on a social network server 102d (not shown) directed to dating, and yet others on social network server (102n) directed to other general interests or perhaps a specific focus.

A profile server 130 is illustrated as a stand-alone server in FIG. 1. In other embodiments of the system 100, all or part of the profile server 130 may be part of the social network server 102a. The profile server 130 is connected to the network 105 via a line 131. The profile server 130 has profiles for all the users that belong to a particular social network server 102a-102n. One or more third party servers 134a through 134n are connected to the network 105, via signal line 135. A web server 132 is connected via line 133 to the network 105.

The social network server 102a includes an upcoming meeting notification application 106a, to which user devices 115a through 115n are coupled via the network 105. In particular, user device 115a is coupled via line 114a to the network 105. The user 125a, via the user device 115a, may access the upcoming meeting notification application 106a to subscribe to one or more entities (e.g., another user, companies, pages for an entity, groups, etc.). Persons of ordinary skill in the art should recognize that in some embodiments, the upcoming meeting notification application 106 or certain components of it may be stored in a distributed architecture in any of the social network server 102, the third party server 134, and the user device 115. The upcoming meeting notification application 106 may be included, either partially or entirely, in any one or more of the social network server 102, the third party server 134, and the user device 115.

The user devices 115a through 115n may be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network.

The network 105 is of conventional type, wired or wireless, and may have any number of configurations such as a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In another embodiment, the network 105 may be a peer-to-peer network. The network 105 may also be coupled to or include portions of one or more telecommunications networks for sending data in a variety of different communication protocols.

In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

In some embodiments, the social network servers 102a-102n, the profile server 130, the web server 132, and the third party servers 134a through 134n are hardware servers including a processor, memory, and network communication capabilities. One or more of the users 125a through 125n access any of the social network servers 102a through 102n, via browsers in their user devices and via the web server 132.

In some embodiments, the user 125 uses the user device 115 (e.g., via a keyboard, mouse, touchscreen, etc.) to access one or more the network 105, a social network server 102, the profile server 130, the web server 132, and a third party server 134. In some embodiments, the user device 115 accesses the social network server 102a to allow the user to schedule a meeting on the social network server 102a via the upcoming meeting notification application 106a. In other embodiments the meeting is scheduled via the user device 115a and/or the third party server 134a. In still other embodiments, the meeting is initiated on one or more servers described in FIG. 1.

Figure 2:
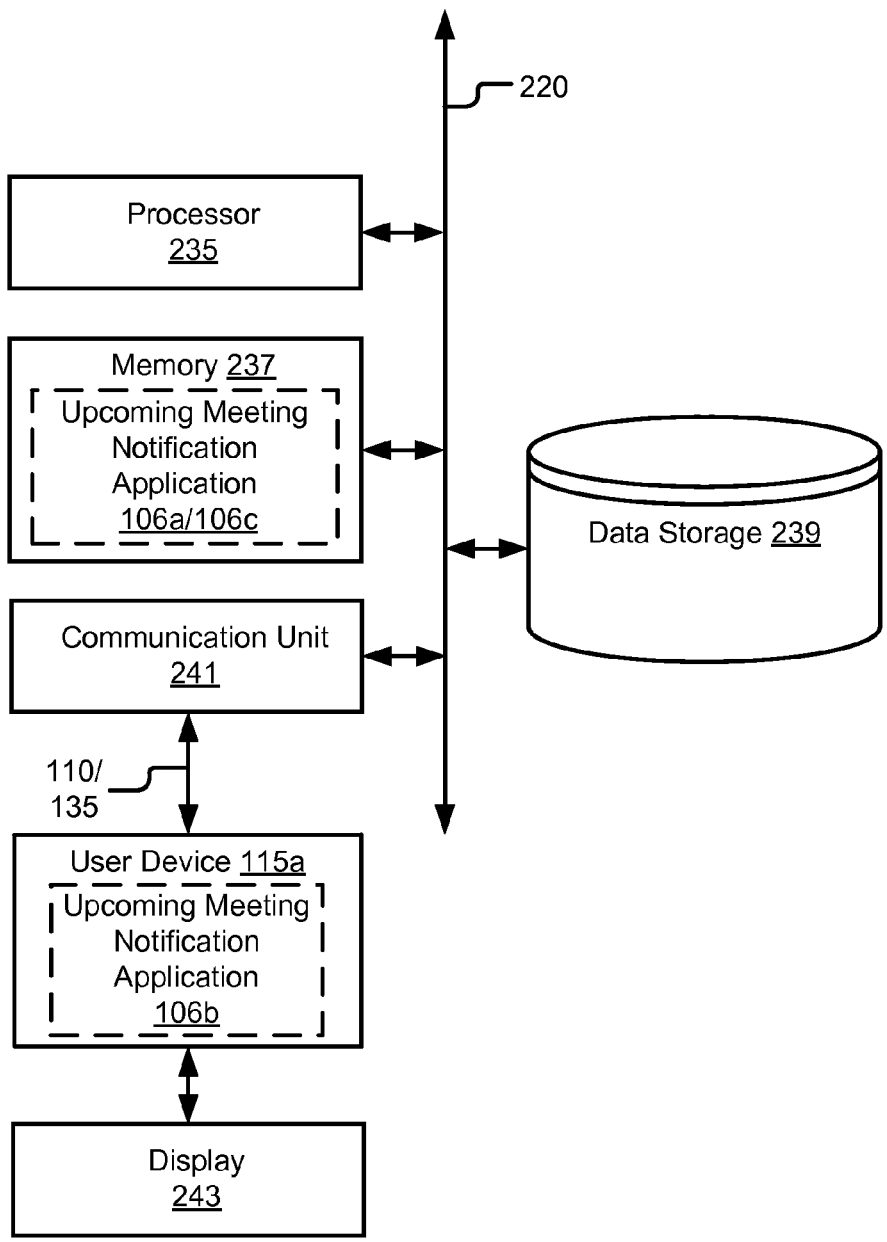
FIG. 2 is a block diagram illustrating hardware components in some embodiments of the systems shown in FIG. 1.

FIG. 2 is a block diagram illustrating some embodiments of a social network server 102 (a through n) and/or the third party server 134 (a through n), including an upcoming meeting notification application 106a/106b/106c. In FIG. 2, like reference numerals have been used to reference like components with the same or similar functionality that has been described above with reference to FIG. 1. Since those components have been described above that description is not repeated here. Each of the social network server 102 and third party server generally comprises one or more processors, although only one processor 235 is illustrated in FIG. 2. The processor is coupled, via a bus 220, to memory 237 and data storage 239, which stores any information obtained for meetings and/or notifications, received from any of the other sources identified above. In some embodiments, the data storage 239 is a database organized by user or participant in a meeting. In some embodiments, the upcoming meeting notification application 106a/106c is stored in the memory 237.

It should be noted that any information that is retrieved for particular users is only upon obtaining the necessary permissions from the users, in order to protect user privacy and any sensitive information of the users.

A user 125a, via a user device 115a, initiates a meeting, communicates with others in a meeting, and/or receives a notification of a meeting, via a communication unit 241. The upcoming meeting notification application 106a and 106c may reside, in their entirety or parts of them, in the user's device (115a through 115n), in the social network server 102a (through 102n), or alternatively, in a separate server, for example the third party server 134 (shown in FIG. 1). The user device 115a communicates with the social network server 102a using the communication unit 241, via signal line 110. The user device 115a is also communicatively coupled to a display 243 configured as part of the user device 115a or separate for displaying information related to meetings.

Figure 3:
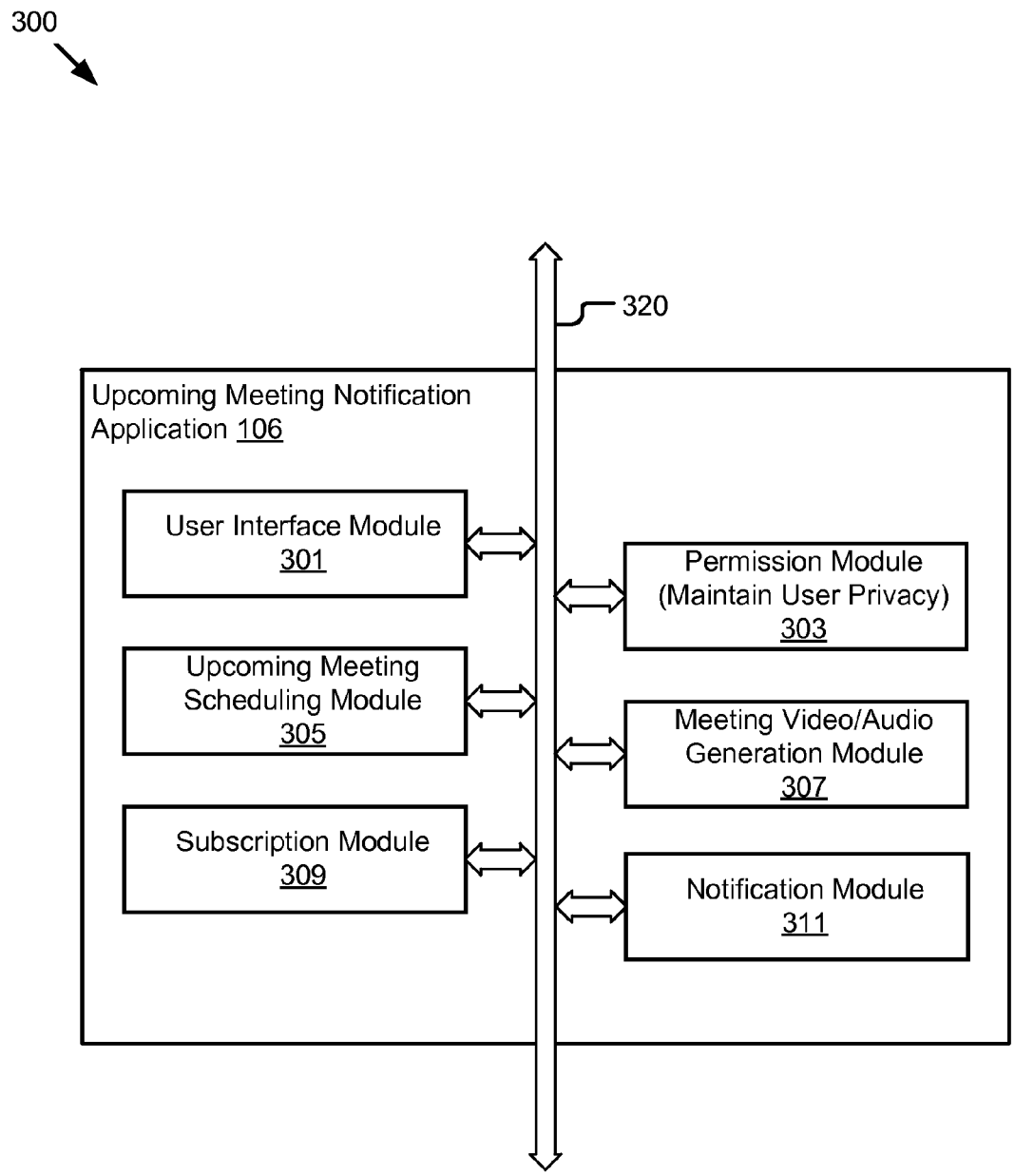
FIG. 3 is a block diagram illustrating some embodiments of the upcoming meeting notification application and its software components.

Referring now to FIG. 3, like reference numerals have been used to reference like components with the same or similar functionality that has been described above with reference to FIGS. 1 and 2. Since those components have been described above that description is not repeated here. FIG. 3 illustrates one example of the upcoming meeting notification application 106a and 106c. The upcoming meeting notification application 106a and 106c, indicated here by reference numeral 300, include various applications or engines that are programmed to perform the functionalities described here. The user interface module 301 generates a user interface for providing a display to users of information relating to one or more communication sessions or meetings. For example, the user interface module 301 may provide a display of the virtual forum in which the communication session occurs, the entities to which a user may subscribe, the "buttons," which a user may press to indicate that he or she wants to subscribe to a particular entity, a list of upcoming meetings, notifications, etc. In some embodiments, the user interface module 301 generates a user interface for displaying an online community (e.g., a social network) and the various entities included in an online community. Some entities displayed may include, for example, profile images, profile names, stream images, stream text, stream videos, various buttons, description data, groups, virtual forums, meeting information, notifications, etc.

The permission module 303 determines permission for viewing user information and joining meetings. The permission module 303 makes certain that the user device is compliant with protocols and any privacy concerns and that any information that is obtained is only after the user is provided notice and/or user consent is obtained.

The upcoming meeting scheduling module 305 schedules upcoming meetings in a virtual forum. The meeting video/audio generation module 307 initiates the meetings scheduled by the upcoming meeting scheduling module 305 by adding one or more participants and initiating the virtual forum (e.g., video chat, instant messaging, audio chat, etc.). The subscription module 309 manages subscriptions by users to one or more entities within an online community. The one or more entities may include, for example, individuals (e.g., a celebrity), company pages, groups, etc. The notification module 311 notifies users of an upcoming or ongoing meeting associated with a particular entity.

The upcoming meeting notification application 106 includes applications or engines that communicate over the software communication mechanism 320. Software communication mechanism 320 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communication can be implemented on any underlying hardware, such as a network, the Internet, a bus 220 (FIG. 2), a combination thereof, etc.

The upcoming meeting scheduling module 305 schedules upcoming meetings in a virtual forum. For example, the upcoming meeting scheduling module 305 receives a meeting name, type of forum (e.g., video chat, instant messaging, audio chat, etc.), date of meeting, time of meeting, one or more participants, etc. After receiving this information (e.g., from a user or a third party) the meeting is scheduled in the system for the received date and time.

The meeting video/audio generation module 307 initiates the meeting scheduled by the upcoming meeting scheduling module 305 by adding the one or more participants to the ongoing or upcoming meeting queue for that particular entity when one or more users designate approval, and initiating the virtual forum (e.g., video chat, instant messaging, audio chat, etc.). For example, after the date and time is received from the upcoming meeting scheduling module 305, the meeting video/audio generation module 307 initiates the meeting by creating the virtual forum specified by the upcoming meeting scheduling module 305.

The subscription module 309 subscribes one or more users to one or more entities within an online community and manages those subscriptions. The one or more entities may include, for example, individuals (e.g., a celebrity), company pages, groups, etc. For example, a user indicates that he would like to subscribe to an entity (e.g., individual, company pages, groups, etc.) by selecting a "button" on user interface display and is flagged as a potential participant. This user preference is recorded in the data storage 239.

The notification module 311 uses meeting information to generate an invitation by the particular entity to one or more users who subscribe to that particular entity. When the particular entity initiates a communication session, the one or more users may be invited to join the communication session. For example, the notification module 311 determines preferences for a particular user who is flagged as a subscriber, by scanning the data storage 239 and subsequently generating a notification (in this case, an invitation) and sending it (e.g., via email, chat, mobile push notification, phone call, etc.). In some embodiments, users who are subscribers to a particular entity are apprised of meetings hosted the particular entity, and the users may select one or more meetings of interest to the subscribing user.

Figure 4:
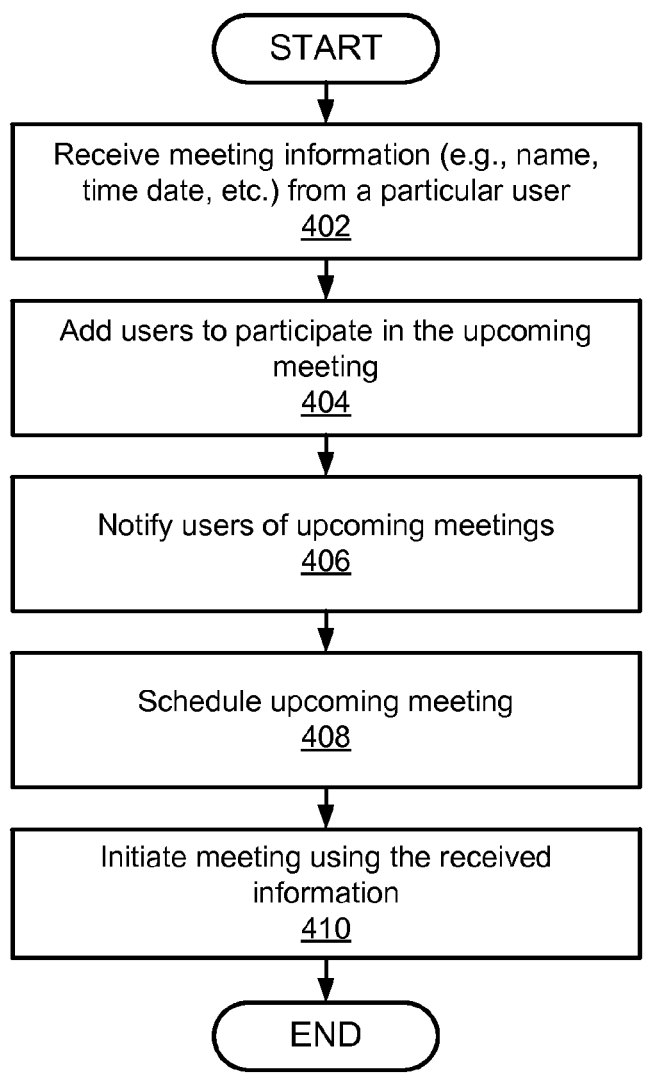
FIG. 4 is a flow chart illustrating an example method for scheduling a meeting or communication session.

FIG. 4 is a flow chart illustrating some embodiments of a method for scheduling a meeting indicated generally by reference numeral 400. First, the method 400 receives meeting information (e.g., name, time, date, etc.) from a particular user as illustrated by block 402. The method proceeds to block 404, at which stage, one or more users are determined as interested and designated to potentially participate in the upcoming meeting. The method proceeds to block 406 and notifies users (who have been added in block 404) of any upcoming meetings for which the user has been flagged as a potential participant. The method proceeds to block 408, at which stage, it schedules a meeting or communication session, using the meeting information received in block 402. The method proceeds to block 410, at which stage, it initiates the meeting using the retrieved information from blocks 402-408.

Figure 5:
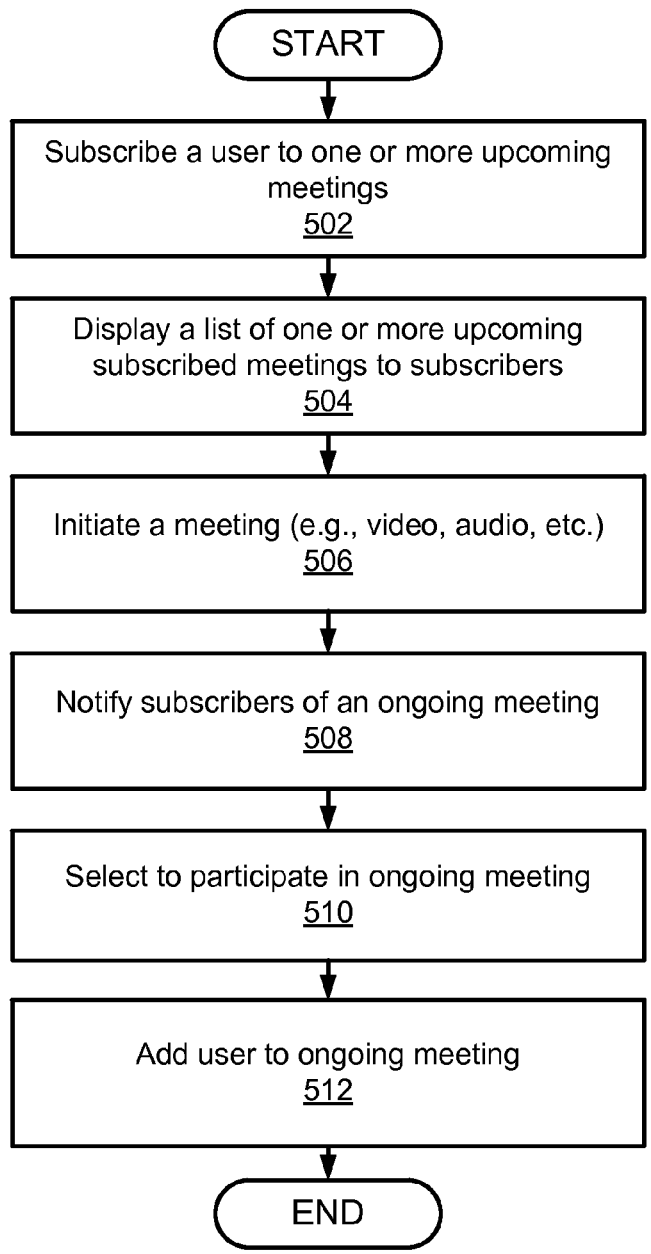
FIG. 5 is a flow chart illustrating an example method for joining a meeting or communication session.

FIG. 5 is a flow chart illustrating some embodiments of a method for joining a meeting illustrated generally by reference numeral 500. First, the method subscribes a user to one or more entities and manages those subscriptions as indicated by block 502. The method proceeds to block 504 and displays a list of one or more upcoming meetings or communication sessions hosted by the particular entity to which users have subscribed. The method proceeds to block 506 and initiates a meeting (e.g., video chat, instant messaging, audio chat, etc.). The method proceeds to block 508 and notifies subscribers of an ongoing meeting by a particular entity to which users have subscribed. The method proceeds to block 510, at which stage, those subscribers that want to participate in the ongoing meeting elect to participate. The method then proceeds to block 512, at which stage, the subscribers or users that elect to participate are added to the ongoing meeting.

Figure 6:
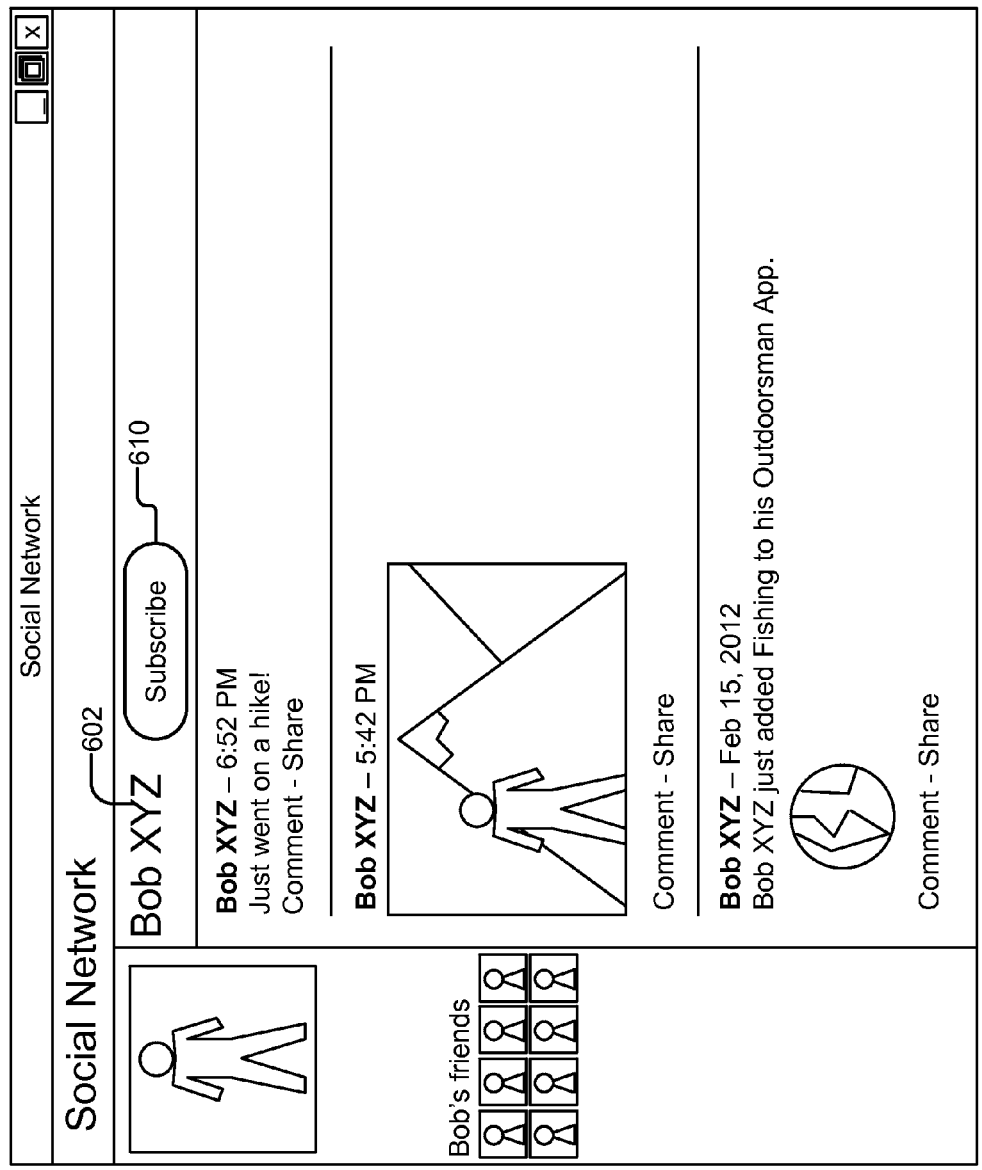
FIG. 6 is a graphical representation of an example user interface illustrating subscription to a particular user of an online community.

FIG. 6 is a graphical representation illustrating some embodiments of a user interface indicating that a user has subscribed to an entity (which, in this example is another user). FIG. 6 illustrates a profile page in a social network, for an individual named Bob XYZ, indicated by reference numeral 602. The profile page also includes a subscription "button" 610 for a user to indicate that he would like to subscribe to any future meetings or communication sessions initiated by the individual Bob XYZ. In yet other embodiments, the "subscribe" button 610 may permit users to subscribe to activities other than meetings (e.g., social stream data). After a user indicates that he or she would like to subscribe to an individual entity; this preference is saved in the data storage 239.

Figure 7:
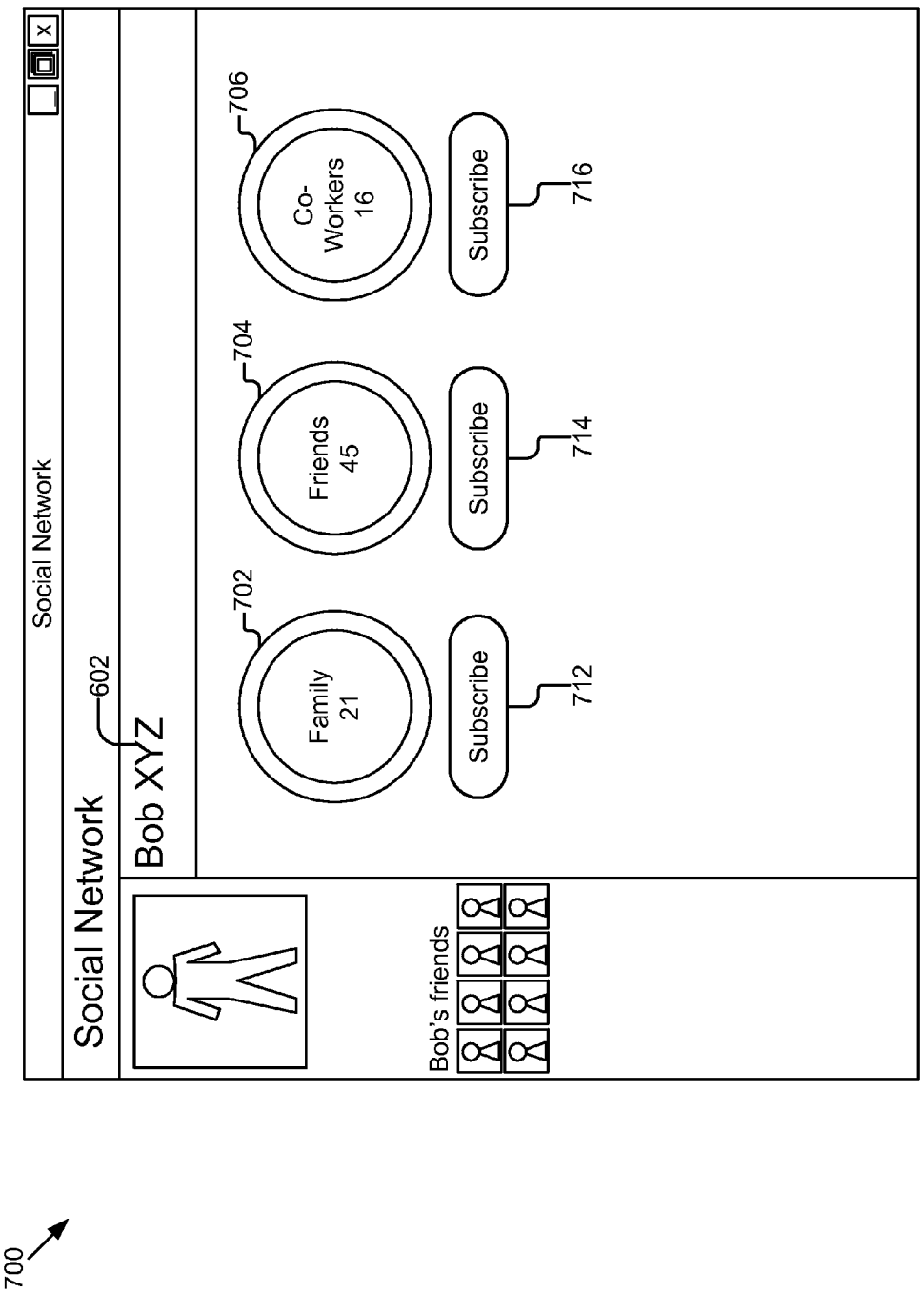
FIG. 7 is a graphical representation of an example user interface illustrating subscriptions to groups of users in an online community.

FIG. 7 is a graphical representation illustrating some embodiments of a user interface to indicate that a user has subscribed to an entity (for example, a group of users). FIG. 7 illustrates a page displaying three separate groups and three separate buttons to indicate subscriptions. A particular user may select the "subscribe" button 712 to subscribe to the family group 702, select the "subscribe" button 714 to subscribe to the friends group 704, and/or select the "subscribe" button 716 to subscribe to the co-workers group 706. In other embodiments, the "subscribe" buttons 612, 614, and 616 may permit particular users to subscribe to activities other than meetings or communication sessions (e.g., social stream data). In some embodiments, after a particular user has indicated that he would like to subscribe to one or more groups; this preference is saved in the data storage 239.

Figure 8:
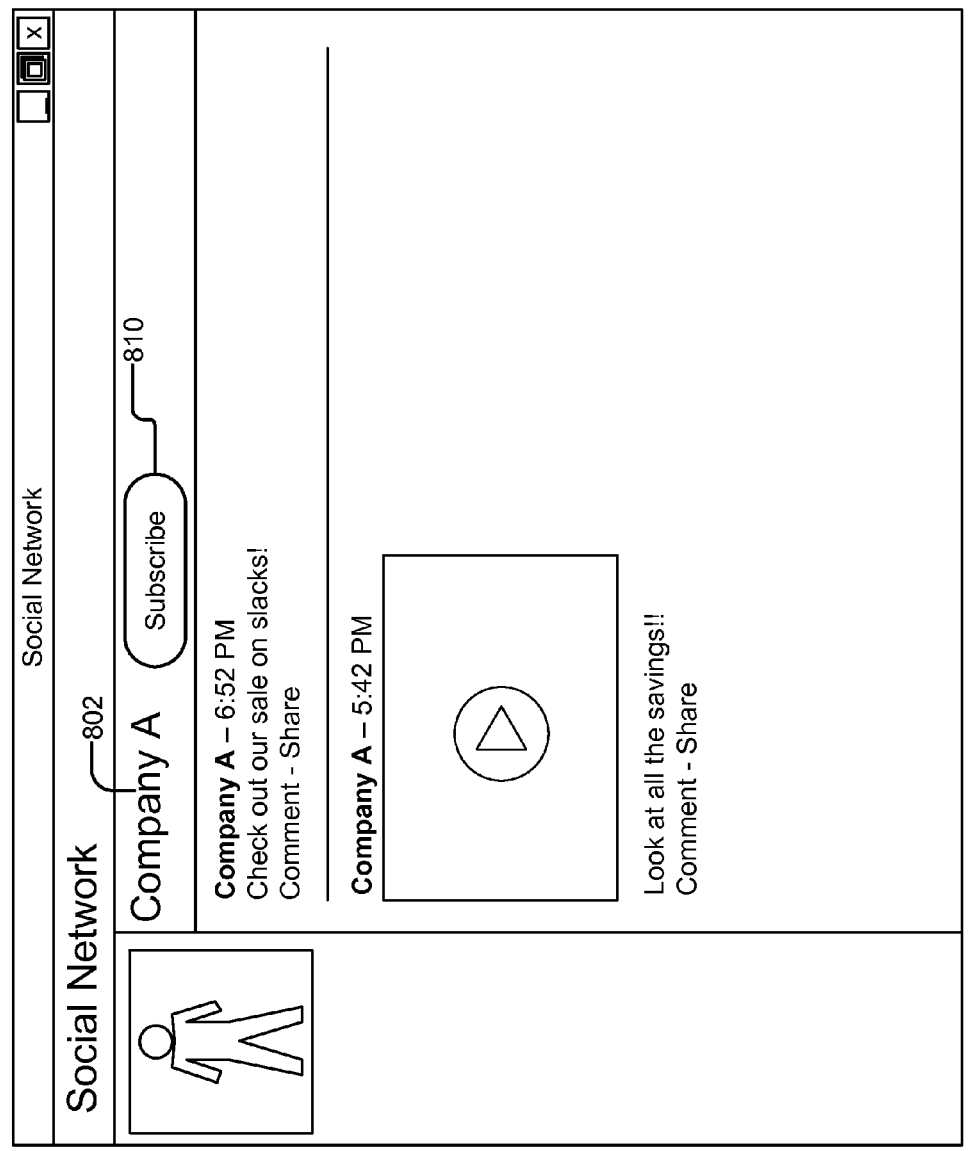
FIG. 8 is a graphical representation of an example user interface illustrating subscription to a page on an online community.

FIG. 8 is a graphical representation illustrating some embodiments of a user interface indicating that one or more particular users have subscribed to a company page. FIG. 8 illustrates a profile page for a Company A in a social network as one example, indicated by reference numeral 802. The profile page also includes a "subscribe" button indicated by reference numeral 810 for a user to indicate that he would like to subscribe to any future meetings or communication sessions initiated or hosted by the Company A. In some embodiments, the "subscribe" button 810 may permit users to subscribe to activities other than meetings (e.g., social stream data). In some embodiments, after the user indicates that he would like to subscribe to one or more groups; this preference is saved in the data storage 239.

Figure 9:
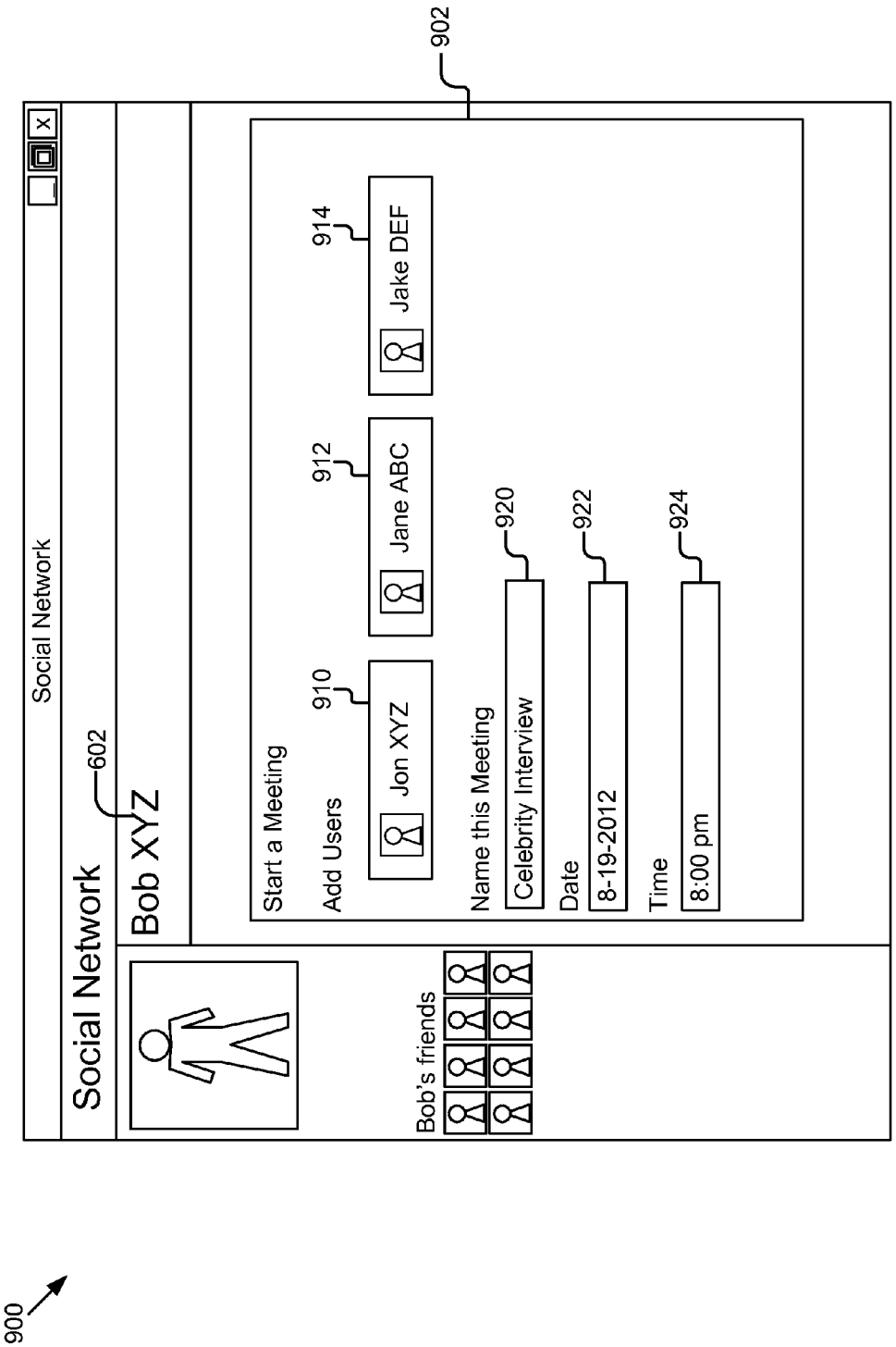
FIG. 9 is a graphical representation of an example user interface illustrating a display associated with a communication session.

FIG. 9 is a graphical representation illustrating some embodiments of a user interface for scheduling a meeting or a communication session. FIG. 9 illustrates an individual Bob XYZ indicated by reference numeral 602, who wishes to schedule a meeting via a meeting scheduler 902. In this example, Bob XYZ has indicated that he would like to schedule a meeting and the user interface engine displays the meeting scheduler 902. Bob XYZ 602 has added Jon XYZ 910, Jane ABC 912, and Jake DEF 914 to the meeting or communication session. In some embodiments, Bob XYZ may indicate that any user is allowed to join his meeting or communication session (i.e., it is public). Bob XYZ has also named the meeting 'Celebrity Interview,' indicated a date of Aug. 19, 2012 and a time of 8:00 pm. In some embodiments, this information is stored in the storage device 239.

Figure 10:
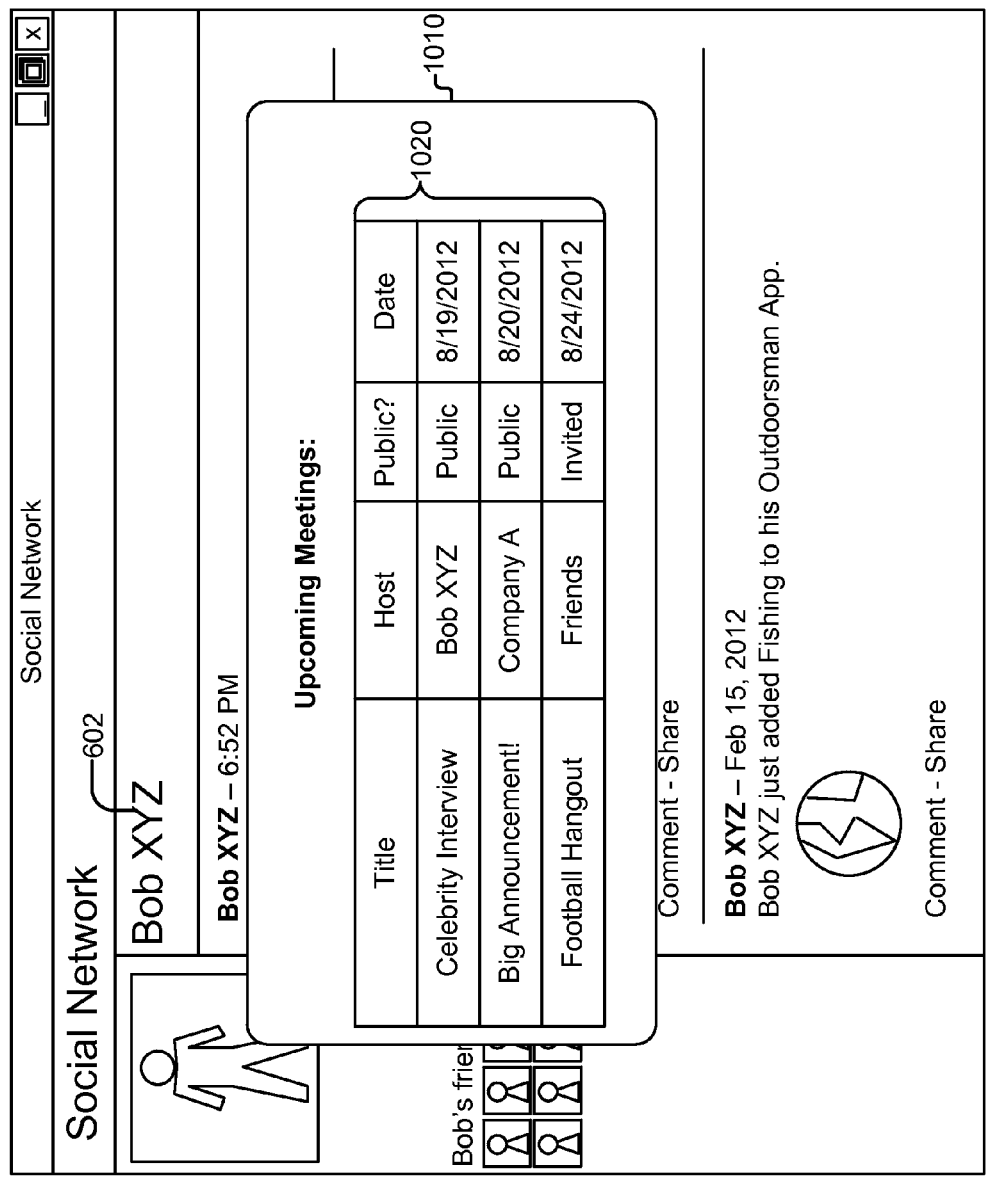
FIG. 10 is a graphical representation of an example user interface illustrating a display of a list of upcoming communication sessions or meetings.

FIG. 10 is a graphical representation illustrating some embodiments of a user interface for displaying a list of upcoming meetings or communication sessions. FIG. 10 includes an upcoming meetings notification 1010 that displays a list of upcoming meetings 1020. In some embodiments, the list of upcoming meetings 1020 is related to the one or more entities to which Jon XYZ (indicated by reference numeral 910) has subscribed. In other embodiments, the upcoming meetings notification 1010 is displayed after Jon XYZ has subscribed to a new entity.

Figure 11:
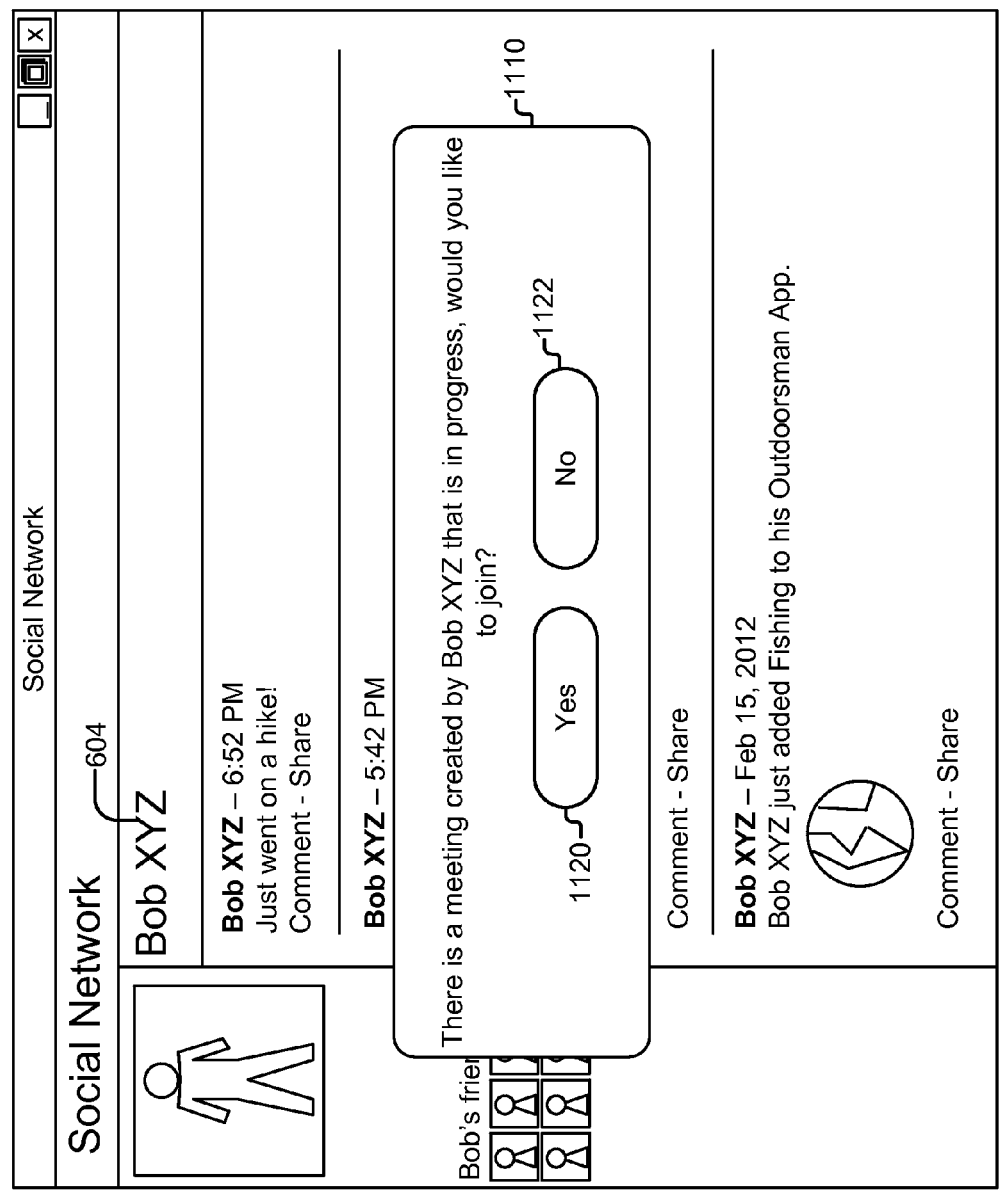
FIG. 11 is a graphical representation of an example user interface illustrating a display of an ongoing communication session or meeting.

FIG. 11 is a graphical representation illustrating some embodiments of a user interface for joining an ongoing meeting. FIG. 11 includes an ongoing meeting notification indicated by reference numeral 1110 displayed on a profile for an individual Jon XYZ (910) within a social network. The ongoing meeting notification 1110 includes a "yes" button 1120 for Jon XYZ (910) to join the ongoing meeting, and a "no" button for Jon XYZ (910) to decline joining the ongoing meeting.

Figure 12:
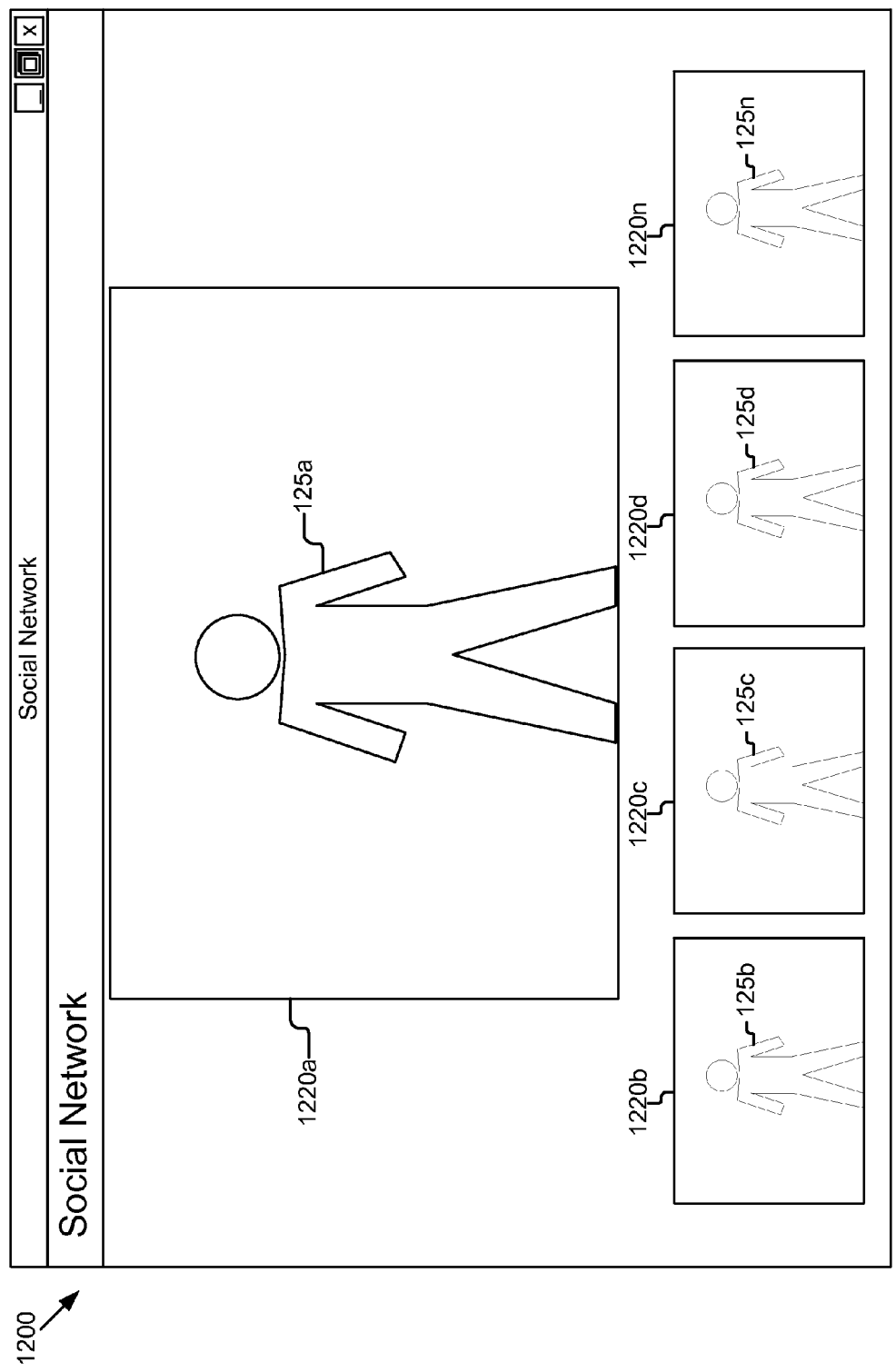
FIG. 12 is a graphical representation illustrating some embodiments of a user interface for a video communication session.

FIG. 12 is a graphical representation illustrating some embodiments of a user interface for a meeting (in a video forum). FIG. 12 illustrates five separate video streams (1220a, 1220b, 1220c, 1220d, and 1220n) for five separate users (125a, 125b, 125c, 125d, and 125n). In some embodiments there can be any number of video streams 1220 for any number of users 125. In other embodiments, the meeting is an audio and/or an instant messaging based forum.

Figure 13:
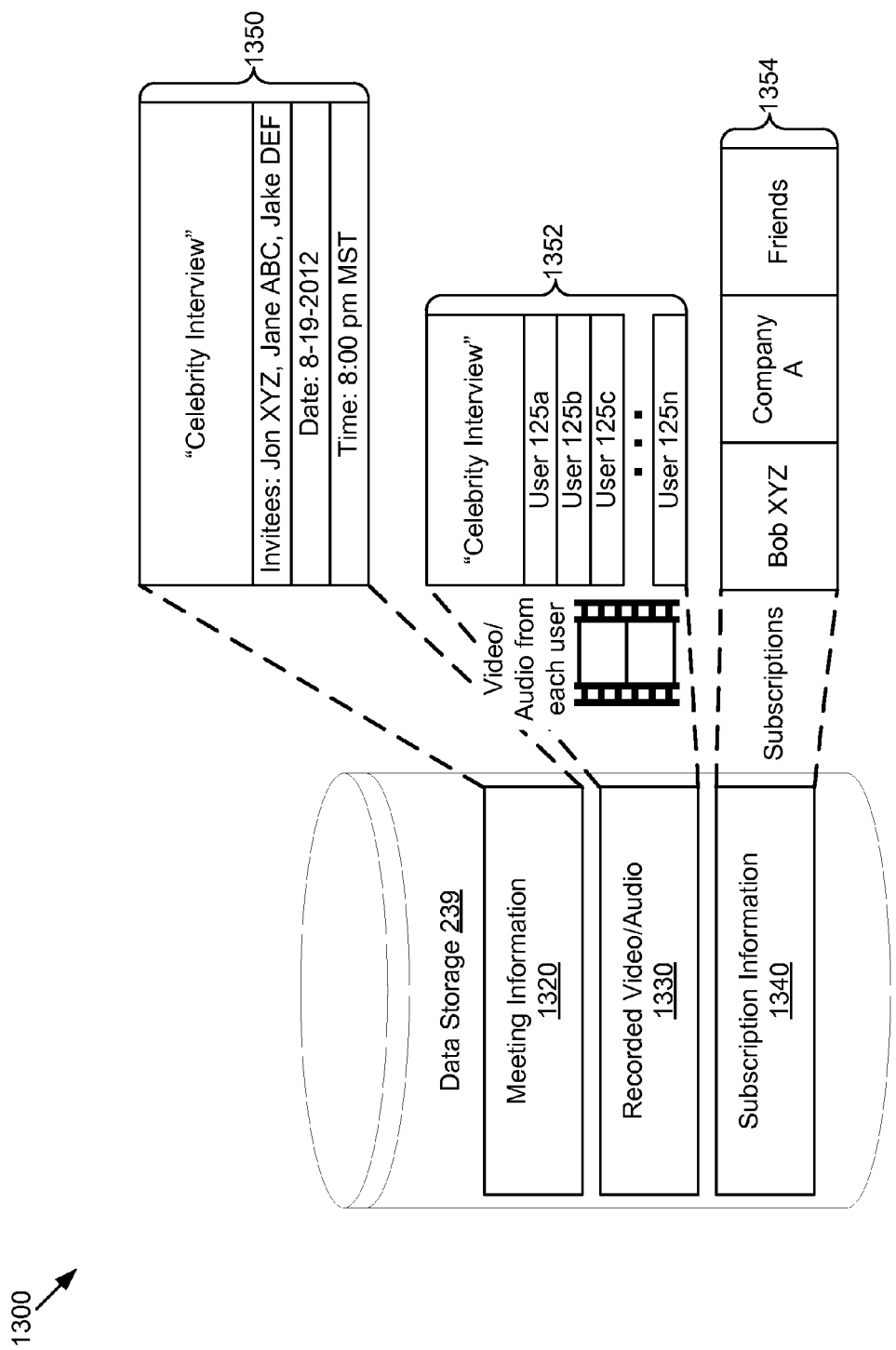
FIG. 13 is a block diagram illustrating some examples of information associated with communication sessions that is stored in data storage.

FIG. 13 is a block diagram illustrating some examples of the types of information stored in the data storage 239. FIG. 13 illustrates the data storage 239 and the data that is stored within it. In some embodiments, the data storage 239 includes meeting information indicated by reference numeral 1320, recorded video/audio/text indicated by reference numeral 1330, and subscription information indicated by reference numeral 1340. For example, the meeting information 1320 includes information 1350 for one or more meetings; this information includes for example, meeting names, invitees, dates, and times. The recorded video/audio/text 1330 includes information 1352 for one or more meetings; this information includes video, audio, and/or text for each meeting participant. For example, the subscription information 1340 includes information 1354 for one or more meetings; this information includes the entities in which the user has subscribed to.

In the preceding description, for purposes of explanation, numerous specific details are indicated in order to provide a thorough understanding of the technology described. It should be apparent, however, to one skilled in the art, that this technology can be practiced without these specific details. In other instances, structures and devices are shown in block diagram form in order to avoid obscuring the technology. For example, the present technology is described with some embodiments above with reference to user interfaces and particular hardware. However, the present technology applies to any type of computing device that can receive data and commands, and any devices providing services. Moreover, the present technology is described above primarily in the context of managing subscriptions by users to particular entities and notifying users with subscriptions of upcoming meetings; however, those skilled in the art should understand that the present technology applies to any type of communication and may be used for other applications beyond communication sessions or meetings. In particular, this technology for managing subscriptions by users to particular entities and notifying users may be used in other contexts besides meetings.

Reference in the specification to "one embodiment," "some embodiments," or "other embodiments" means simply that one or more particular features, structures, or characteristics described in connection with the one or more embodiments is included in at least one or more embodiments that are described. The appearances of the phrase "in some embodiments" in various places in the specification are not necessarily all referring to the same embodiment.

Some portions of the detailed descriptions that precede are presented in terms of algorithms and symbolic representations of operations on data bits within a computer memory of either one or more computing devices. These algorithmic descriptions and representations are the means used by those skilled in the data processing arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the preceding discussion, it should be appreciated that throughout the description, discussions utilizing terms such as "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology can take the form of an entirely hardware embodiment, an entirely software embodiment, or an embodiment including both hardware and software components. In some embodiments, this technology is implemented in software, which includes but is not limited to firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description above. In addition, the present technology is not described with reference to any particular programming language. It should be understood that a variety of programming languages may be used to implement the technology as described here.

The foregoing description of the embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method for managing subscriptions to virtual conferences associated with a particular entity within an online community, the method comprising:

receiving, using at least one computing device, from one or more users within the online community, one or more requests to subscribe to the virtual conferences associated with the particular entity within the online community;

storing, using the computing device, subscription information for the one or more users relating to the virtual conferences associated with the particular entity within the online community, the subscription information being an identification of one or more entities to which a user of the one or more users is subscribed and information for the virtual conferences;

receiving, using the computing device, information related to an upcoming virtual conference related to the particular entity;

based at least in part on receiving information related to a particular virtual conference related to the particular entity and the stored subscription information for the one or more users, sending a notification, using the computing device, to the one or more users, wherein the notification relates to the upcoming virtual conference related to the particular entity;

receiving, using the computing device, a request by the one or more users to join the particular virtual conference; and based at least in part on receiving the request by the one or more users to join the upcoming virtual conference, adding, using the computing device, others of the one or more users to the upcoming virtual conference when in progress.

2. A computer-implemented method, comprising:

receiving, using at least one computing device, one or more requests from one or more users within the online community, to subscribe to a virtual conference associated with a particular entity within an online community;

accessing, using the computing device, subscription information identifying one or more entities to which a user of the one or more users is subscribed and information related to virtual conferences associated with the one or more entities for the one or more users relating to the particular entity within the online community, the virtual conferences being virtual meetings for online discussions;

receiving, using the computing device, information relating to an upcoming virtual conference relating to the particular entity;

based at least in part on receiving the information related to a particular virtual conference related to the particular entity and the subscription information for the one or more users, sending a notification, using the computing device, to the one or more users, wherein the notification relates to the upcoming virtual conference relating to the particular entity;

receiving, using the computing device, a request by the one or more users to join the upcoming virtual conference; and based at least in part on receiving the request by the one or more users to join the upcoming virtual conference, adding, using the computing device, others of the one or more users to the upcoming virtual conference when in progress.

3. A computer-implemented method according to claim 2, further comprising:

providing for display to the one or more users, using the computing device, the notification and information on the upcoming virtual conference.

4. A computer-implemented method according to claim 2, wherein the information is used to generate an invitation by the particular entity to the one or more users to participate in the upcoming virtual conference and wherein the one or more users send the request further to the invitation.

5. A computer-implemented method according to claim 2, wherein the information is used by the one or more users to select the upcoming virtual conference of interest from a plurality.

6. A computer-implemented method according to claim 2, wherein the particular entity is an individual within the online community.

7. A computer-implemented method according to claim 2, wherein the particular entity is a company page within the online community.

8. A computer-implemented method according to claim 2, wherein the particular entity is a group within the online community.

9. A computer-implemented method according to claim 2, wherein the one or more users subscribe to virtual conferences of two or more entities within the online community.

10. A system for managing subscriptions to virtual conferences associated with a particular entity within an online community, the system comprising:

a subscription module, including at least one computing device and configured to receive one or more requests from one or more users within the online community to subscribe to the virtual conferences, the virtual conferences being virtual meetings for online discussions;

a storage unit for storing subscription information identifying one or more entities to which a user of the one or more users is subscribed and information for the virtual conferences for the one or more users, configured to enable the one or more users to join the virtual conferences;

a notification module including at least one computing device and configured to notify the one or more users of the virtual conferences for the particular entity; and a virtual conference module including at least one computing device and configured to receive information relating to an upcoming virtual conference, receive a request by the one or more users to join the upcoming virtual conference and add the one or more users to the upcoming virtual conference for the particular entity upon receiving the request.

11. A system according to claim 10, further comprising:

a user interface module configured to display to the one or more users information on the virtual conferences.

12. A system according to claim 10, wherein the information is used to generate the request transmitted to the one more users.

13. A system according to claim 10, wherein the information is used by the one or more users to select a virtual conference of interest.

14. A system according to claim 10, wherein the particular entity is an individual within the online community.

15. A system according to claim 10, wherein the particular entity is a company page within the online community.

16. A system according to claim 10, wherein the particular entity is a group within the online community.

17. A system according to claim 10, wherein the one or more users subscribe to virtual conferences of two or more entities within the online community.

* * * * *